(12) United States Patent
Kay et al.

(10) Patent No.: US 8,427,937 B1
(45) Date of Patent: Apr. 23, 2013

(54) BRIDGING FOR SONET/SDH AUTOMATIC PROTECTION SWITCHING

(75) Inventors: Brian Arthur Kay, Ottawa (CA); Patrick Raymond Maheral, Ottawa (CA)

(73) Assignee: Dragonwave, Inc., Kanata, ON (CA)

( * ) Notice: Subject to any disclaimer, the term of this patent is extended or adjusted under 35 U.S.C. 154(b) by 200 days.

(21) Appl. No.: 12/382,030

(22) Filed: Mar. 6, 2009

(51) Int. Cl.
*H04L 1/00* (2006.01)

(52) U.S. Cl.
USPC .......................................... 370/217

(58) Field of Classification Search .................. 370/216, 370/217, 218, 219, 221, 222, 223; 398/1, 398/2, 3, 4, 7, 8
See application file for complete search history.

(56) References Cited

U.S. PATENT DOCUMENTS

| | | | |
|---|---|---|---|
| 7,167,442 B2 * | 1/2007 | Courtney et al. | 370/217 |
| 2003/0002505 A1 * | 1/2003 | Hoch et al. | 370/392 |
| 2005/0265329 A1 * | 12/2005 | Havala et al. | 370/389 |
| 2009/0003326 A1 * | 1/2009 | Ozaki | 370/359 |

OTHER PUBLICATIONS

"Synchronous Optical Network (SONET) Transport Systems: Common Generic Criteria", GR-253-CORE, Issue 4, Dec. 2005, downloaded from: http://linktech.com/down/GR-253-CORE%20Issue%204.pdf on May 11, 2011.

* cited by examiner

*Primary Examiner* — Obaidul Huq

(57) ABSTRACT

Bridging for Synchronous Optical NETwork (SONET)/Synchronous Digital Hierarchy (SDH) Automatic Protection Switching is disclosed. First and second apparatus in a redundant pair handle communication traffic that includes content for transmission on respective first and second SONET/SDH connections. Content received by each apparatus for transmission on a SONET/SDH connection is transmitted on the first and second SONET/SDH connections. Such content is also transmitted by each apparatus to the other apparatus in the redundant pair unless that content was received from the other apparatus. The content is thereby transmitted on both the first and second SONET/SDH connections even though the content is received directly by only one apparatus of the redundant pair. This avoids duplication of communication traffic that carries the content. Where the traffic is Ethernet traffic, the traffic may be bridged between the first apparatus and the second apparatus at the Media Access Control (MAC) layer.

20 Claims, 3 Drawing Sheets

US 8,427,937 B1

BRIDGING FOR SONET/SDH AUTOMATIC PROTECTION SWITCHING

FIELD OF THE INVENTION

This invention relates generally to redundancy protection and, in particular, to bridging of communication traffic between redundant components to enable Automatic Protection Switching (APS) for Ethernet connections.

BACKGROUND

APS for Synchronous Optical NETwork (SONET)/Synchronous Digital Hierarchy (SDH) technology according to the GR-253-CORE specification entitled "Synchronous Optical Network (SONET) Transport Systems: Common Generic Criteria", for example, requires electrical bridging between components which support redundant network-side SONET/SDH connections to subtending equipment. Electrical bridging at the physical layer provides for transmission of the same SONET/SDH payloads on redundant network-side optical connections. In a 1+1 linear APS implementation, traffic is bridged from a working connection to a protection connection at transmitting equipment, and receiving equipment normally selects traffic from the working connection. A fault or other condition affecting the working connection causes an APS operation, and traffic is then selected from the protection connection.

Physical layer bridging tends to be implemented in a single equipment chassis. This can significantly limit the actual level of protection that is provided, in that a failure affecting one equipment installation would interrupt traffic flow.

Such bridging also provides protection only for the optical SONET/SDH connections, and not for further connections, such as access-side connections from which traffic for SONET/SDH connections originates.

SUMMARY

Some embodiments of the invention allow SONET/SDH payloads to be derived from other traffic, such as Ethernet frames which are destined for either one of two different Ethernet MAC addresses. This can provide redundancy protection for Ethernet traffic while still providing support for optical connection APS.

According to an aspect of the invention, an apparatus includes an optical interface that enables communications via a SONET/SDH connection; an interface that enables reception of communication traffic comprising content for transmission from the apparatus via the SONET/SDH connection; an inter-apparatus interface that enables communications between the apparatus and a further apparatus, the further apparatus including an optical interface that enables communications via a further SONET/SDH connection and an interface that enables reception of communication traffic comprising content for transmission from the further apparatus via the further SONET/SDH connection, the apparatus and the further apparatus forming a redundant pair; and a bridging module, operatively coupled to the optical interface, to the interface, and to the inter-apparatus interface. The bridging module provides content that is for transmission from the apparatus via the SONET/SDH connection and is received through the interface to the optical interface for transmission via the SONET/SDH connection, and transmits the content to the further apparatus through the inter-apparatus interface for transmission via the further SONET/SDH connection. The bridging module also provides content that is for transmission from the further apparatus via the further SONET/SDH connection and is received through the inter-apparatus interface to the optical interface for transmission via the SONET/SDH connection.

In some embodiments, the interface includes an Ethernet interface that enables reception of Ethernet traffic destined for a first Ethernet Media Access Control (MAC) address, and the interface of the further apparatus includes an Ethernet interface that enables reception of Ethernet traffic destined for a second Ethernet MAC address different from the first Ethernet MAC address.

Where the Ethernet traffic destined for the first Ethernet MAC address includes Ethernet frames, the bridging module may transmit content to the further apparatus through the inter-apparatus interface as Ethernet frames.

The apparatus may also include a traffic processor, operatively coupled to the bridging module and to the optical interface, that receives content from the bridging module, synthesizes a SONET/SDH payload comprising the content, and transmits the SONET/SDH payload via the SONET/SDH connection. Where the interface includes an Ethernet interface that enables reception of Ethernet traffic including Ethernet frames, the bridging module may provide content to the traffic processor as Ethernet frames, and the traffic processor then synthesizes the SONET/SDH payload from the Ethernet frames.

The bridging module itself synthesizes a SONET/SDH payload including received content and provides the SONET/SDH payload to the optical interface in some embodiments.

A state module may also be implemented in the apparatus. The state module determines whether the apparatus is in a first operating state or a second operating state in the redundancy pair.

The state module may determine whether the apparatus is in the first operating state or the second operating state on the basis of one or more of: communication traffic that is received through the interface, whether the content for, transmission via the SONET/SDH connection is received through the interface or the content for transmission from the further apparatus via the further SONET/SDH connection is received through the inter-apparatus interface, and a state indication received from the further apparatus through the inter-apparatus interface, the state indication providing an indication of a current operating state of the further apparatus in the redundancy pair.

In some embodiments, the state module further transmits a state indication to the further apparatus through the inter-apparatus interface, the state indication providing an indication of the determined operating state of the apparatus.

A method is also provided, and includes receiving, at a first apparatus that handles communication traffic including content for transmission via a first SONET/SDH connection, content for transmission from the first apparatus via the first SONET/SDH connection, the first apparatus forming a redundant pair with a second apparatus that handles communication traffic including content for transmission via a second SONET/SDH connection; determining whether the received content was received from the second apparatus; transmitting the received content via the first SONET/SDH connection; and where the received content was not received from the second apparatus, further transmitting the received content to the second apparatus for transmission via the second SONET/SDH connection.

In some embodiments, the first apparatus handles Ethernet traffic destined for a first Ethernet MAC address, and the second apparatus handles Ethernet traffic destined for a second Ethernet MAC address different from the first Ethernet MAC address. Where the Ethernet traffic destined for the first Ethernet MAC address including Ethernet frames, further transmitting the received content to the second apparatus may involve transmitting the received content as Ethernet frames.

The method may also include synthesizing a SONET/SDH payload comprising the received content, and in this case, transmitting the received content via the first SONET/SDH connection may involve transmitting the SONET/SDH payload. Where the communication traffic includes Ethernet frames, synthesizing may involve synthesizing the SONET/SDH payload from the Ethernet frames.

In some embodiments, the method also includes determining whether the first apparatus is in a first operating state or a second operating state on the basis of one or more of: communication traffic that is received at the apparatus, whether the received content was received at the first apparatus from the second apparatus, and a state indication received from the second apparatus, the state indication providing an indication of a current operating state of the second apparatus in the redundancy pair.

Such a method may be embodied, for example, in a computer-readable medium encoded with computer executable instructions which when executed cause a computer to perform the method.

A system is also provided, and includes a first apparatus, operatively coupled to a first SONET/SDH connection, for handling communication traffic including content for transmission from the first apparatus via the first SONET/SDH connection; and a second apparatus, operatively coupled to the first apparatus and to a second SONET/SDH connection, for handling communication traffic including content for transmission from the second apparatus via the second SONET/SDH connection. The first apparatus and the second apparatus form a redundant pair, and each of the first apparatus and the second apparatus includes a bridging module. The bridging module of the first apparatus transmits content on the first SONET/SDH connection and, where the content was not received from the second apparatus, further transmits the content to the second apparatus for transmission on the second SONET/SDH connection. The bridging module of the second apparatus transmits content on the second SONET/SDH connection and, where the content was not received from the first apparatus, further transmits the content to the first apparatus for transmission on the first SONET/SDH connection.

The first apparatus might handle Ethernet traffic including Ethernet frames that contain content for transmission via the first SONET/SDH connection, and the second apparatus might handle Ethernet traffic including Ethernet frames that contain content for transmission via the second SONET/SDH connection. In this case, the bridging module of each apparatus could further transmit the content to the other apparatus in Ethernet frames.

In some embodiments, the first apparatus handles Ethernet traffic destined for a first Ethernet MAC address, and the second apparatus handles Ethernet traffic destined for a second Ethernet MAC address different from the first Ethernet MAC address.

Each apparatus may also include a traffic processor operatively coupled to the bridging module of the apparatus, the traffic processor receiving from the bridging module the content for transmission from the apparatus via its SONET/SDH connection, synthesizing a SONET/SDH payload comprising the content, and transmitting the SONET/SDH payload via the SONET/SDH connection.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

Redundancy protection is provided in some embodiments through Ethernet MAC bridging. This type of Layer 2 bridging can be used, for example, to protect customer Ethernet traffic including content that is to be transferred over an APS-protected SONET/SDH connection. Ethernet MAC bridging provides for redundancy using two different MAC addresses but without duplicating Ethernet traffic in the subtending Ethernet network. The SONET/SDH payload can then be synthesized from Ethernet traffic that is bridged at the MAC layer, and thus the same SONET/SDH payload is presented to subtending SONET/SDH equipment via redundant optical links.

Figure 1:
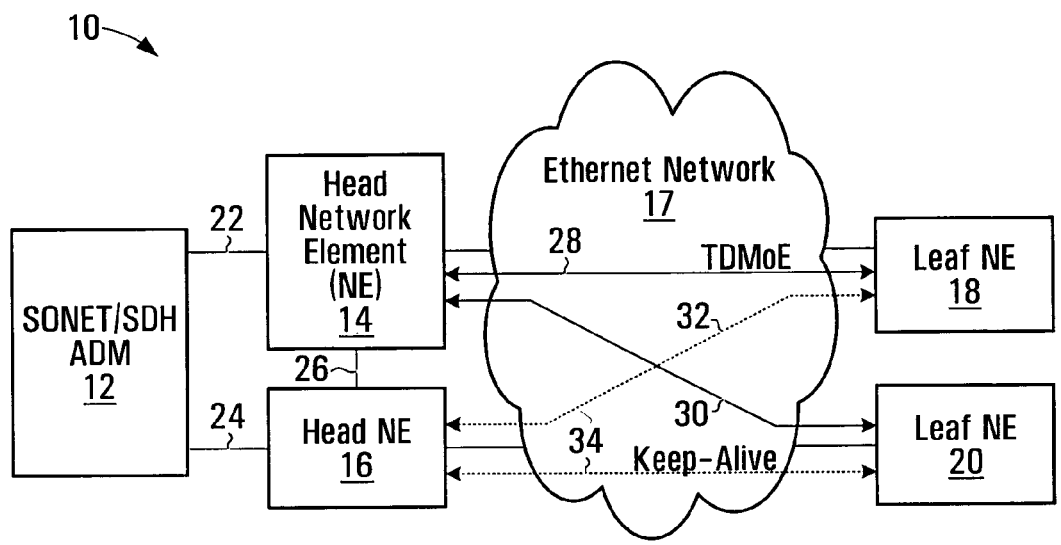
FIG. 1 is a block diagram of an example communication network implementation.

FIG. 1 is a block diagram of an example communication network implementation. The example communication network 10 includes a SONET/SDH Add Drop Multiplexer (ADM) 12 coupled to head network elements 14, 16 through respective optical links 22, 24. The head network elements 14, 16 are also coupled to each other through a connection 26, and to leaf network elements 18, 20 through an Ethernet network 17. Communications between the head network elements 14, 16 and the leaf network elements 18, 20 are represented in FIG. 1 at 28, 30, 32, 34. It should be appreciated that the system of FIG. 1, as well as the contents of the other drawings, are intended solely for illustrative purposes, and that the present invention is in no way limited to the particular example embodiments explicitly shown in the drawings and described herein.

In one common architecture, optical and multiplexer network elements convert and transfer communication traffic between access-side T1 connections, which are often leased lines, and network-side optical links. T1 connections might be leased to carry traffic from base stations in a wireless network back to an optical aggregation point and into a core network, for instance. Such leased connections, however, can significantly increase operating costs for an operator of the wireless network.

Although other technologies such as Ethernet might provide a much more cost efficient alternative to leased T1 connections, communication equipment that supports optical communications through SONET/SDH connections, for example, tends to be geared toward T1 implementations at the "electrical" connection side.

One possible application of the example communication network 10 would be to allow the Ethernet network 17 to be used as the transport mechanism between the SONET/SDH connections on the optical links 22, 24 and access-side connections (not shown) at the leaf network elements 18, 20. For example, the leaf network elements 18, might include T1 interfaces for connection to existing base station equipment which would otherwise communicate with a core network over T1 connections, and convert to Time Division Multiplexing over Ethernet (TDMoE) to transfer traffic in the Ethernet network 17. At the head network elements 14, 16, traffic is further processed for transfer over the SONET/SDH connections on the optical links 22, 24. Thus, T1 leased lines can be avoided while still transporting traffic to and from a core network through optical links. The head network elements 14, 16 and the leaf network elements 18, 20 handle any interworking between SONET/SDH connections on the optical links 22, 24 and the Ethernet network 17, and between the Ethernet network and access-side T1 connections in this example.

The SONET/SDH ADM 12 may be implemented in substantially the same manner as existing SONET/SDH ADMs. It will become apparent as the present specification proceeds that embodiments of the invention need not affect the way in which optical links, SONET/SDH connections, and even 1+1 APS for SONET/SDH connections operate.

Figure 2:
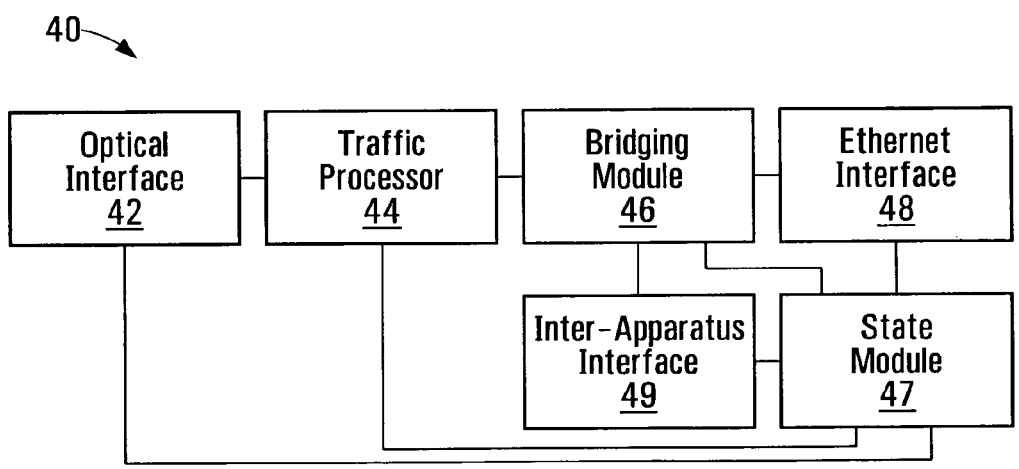
FIG. 2 is a block diagram of an example apparatus according to an embodiment of the invention.

At least the optical side of the head network elements 14, 16 may similarly be implemented in substantially the same way as existing network components, such as optical and multiplexer network elements. An illustrative example of an apparatus that might be implemented in a head network element 14, 16 to provide additional features in accordance with embodiments of the invention is shown in FIG. 2 and described in further detail below.

Each leaf network element 18, 20 includes at least an Ethernet interface, an interface to other equipment with which it exchanges communication traffic, and traffic processing components. In one embodiment noted above, each leaf network element 18, 20 includes a T1 interface and allows traffic to be transported through the Ethernet network 17 rather than T1 connections.

Operation of the network 10 can perhaps best be illustrated by considering an example. Suppose that the leaf network elements 18, 20 include respective Ethernet interfaces that are addressable in the Ethernet network 17 and T1 interfaces for terminating access-side T1 connections. When traffic is received on a T1 connection, the corresponding leaf node 18, 20 generates TDMoE frames destined for one of the head network elements 14, 16. These Ethernet frames carry voice information where the T1 connections at the leaf network elements 18, 20 originate in a base station of a wireless voice communication network for instance. Although the head network elements 14, 16 are intended to provide redundant protection for Ethernet communications in the example network 10, in order to avoid duplicating traffic in the Ethernet network 17 the leaf network elements 18, 20 forward the TDMoE frames to only one of the head network elements 14, 16, as represented at 28, 30.

In one embodiment, one of the head network elements 14, 16 is in a first state and the other is in a second state at any time. For ease of reference, the first state is also described herein as an In-Service state, and the second state is described herein as a Standby state. It should be appreciated however, that embodiments are not limited to implementations using states which are characterized in this or any other particular manner. Operating states in redundancy groups are also often referred to as Active and Inactive, for example, and any designations or names may be used for such operating states.

The head network element 14 is in the In-Service state and the head network element 16 is in the Standby state in the example shown in FIG. 1. The leaf network elements 18, 20 send TDMoE frames to the In-Service head network element 14. This is represented in FIG. 1 at 28, 30. Bridging of traffic at the In-Service head network element 14 as disclosed herein allows redundancy protection to be provided for communications in the Ethernet network 17 even though traffic is sent to only a single destination, namely the In-Service head network element, by the leaf network elements 18, 20. Duplicate Ethernet traffic need not be sent from the leaf network elements 18, 20 to both of the head network elements 14, 16.

Keep-Alive signalling between the Standby head network element 16 and the leaf network elements 18, 20 is represented at 32, 34, and is used in one embodiment to prevent the leaf network elements 18, 20 and any intermediate routing nodes or components (not shown) in the Ethernet network 17 from aging the address of the Standby head network element out of their routing tables. For example, Keep-Alive signalling might include packets which are sent to the Standby head network element 16 by the leaf network elements 18, 20, and response packets which are echoed back to the leaf network elements by the Standby head network element 16. A similar signalling scheme could be used during startup or initialization to enable the leaf network elements 18, 20 to determine which head network element 14, 16 is to be in the In-Service state.

In the event of a loss or possibly degradation of communications with the In-Service head network element 14, the leaf network elements 18, 20 begin sending traffic to the Standby head network element 16. The Standby head network element 16 then enters the In-Service state, and the former In-Service head network element 14 transitions to the Standby state.

Embodiments of the present invention are directed primarily to bridging of traffic between redundant network elements. Further details regarding the management of In-Service and Standby states and the exchange of traffic and other signals such as Keep-Alive packets between head network elements such as 14, 16 and leaf network elements such as 18, 20 are provided in co-pending United States Patent Application Serial No. 12/382,031, entitled "OPERATING STATE CONTROL IN REDUNDANCY. PROTECTION SYSTEMS", filed of even date herewith, which is incorporated in its entirety herein by reference.

In order to support redundancy protection for SONET/SDH connections on the optical links 22, 24, the same SONET/SDH payload is to be transmitted on both connections. As noted above for the example system 10, however, duplicate Ethernet traffic is not transmitted through the Ethernet network 17 between the leaf network elements 18, 20 and the head network elements 14, 16. The leaf network elements 18, 20 send live TDMoE traffic to only the In-Service head network element, which is the head network element 14 in the example shown in FIG. 1. In accordance with one aspect of the invention, payload mirroring for the SONET/SDH connections on the optical links 22, 24 is provided by bridging content, illustratively in the form of Ethernet frames, from the In-Service head network element 14 to the Standby head network element 16 using the connection 26. In an implementation that bridges Ethernet frames between equipment such as the head network elements 14, 16, the connection 26 may be an Ethernet link. Other embodiments may use different types of connections between redundant equipment.

The In-Service head network element 14 receives and processes TDMoE frames to synthesize the SONET/SDH payload for transmission to the SONET/SDH ADM 12, and also re-directs the received frames to the Standby head network element 16 through the connection 26. The Standby head network element 16 receives the TDMoE frames, synthesizes the SONET/SDH payload, and presents it to subtending SONET/SDH equipment, which is the ADM 12 in the example system 10. This provides mirrored SONET/SDH payloads for redundancy protection of communications on the optical links 22, 24, using GR-253 1+1 APS for instance.

FIG. 2 is a block diagram of an example apparatus 40 according to an embodiment of the invention. The example apparatus 40 includes an optical interface 42, a traffic processor 44 operatively coupled to the optical interface, and a bridging module 46 operatively coupled to the traffic processor, to a state module 47, to an Ethernet interface 48, and to an inter-apparatus interface 49. The state module 47 is also operatively coupled to the optical interface 42, to the traffic processor 44, to the Ethernet interface 48, and to the inter-apparatus interface 49. Communication equipment in which the example apparatus 40 is implemented, such as a head network element 14, 16 (FIG. 1) may include additional components that have not been explicitly shown in FIG. 2 in order to avoid overly complicating the drawing. More generally, other embodiments may include further, fewer, or different components which may be interconnected in a similar or different order than shown.

The optical interface 42 includes components which support communications over an optical link, and in particular a SONET/SDH connection in one embodiment. Such components often include hardware at least in the form of a physical port or connector and an optical multiplexer. The exact structure of the optical interface 42 may, to at least some extent, be implementation-dependent, and could vary depending on the type of connection(s) and/or protocol(s) to be supported.

Other components which provide higher-level functions such as communication protocol support may also be implemented, in the optical interface 42 and/or in the traffic processor 44. The traffic processor 44 is intended to represent a module that handles communication traffic that is received by the apparatus 40. When implemented in a head network element 14, 16 (FIG. 1), for example, the traffic processor 44 might process received Ethernet frames to extract content for transmission via a SONET/SDH connection. Hardware, firmware, components which execute software, or some combination thereof might be used in implementing the traffic processor 44, and possibly other elements of the example apparatus 40. Electronic devices that may be suitable for this purpose include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

The bridging module 46 and the state module 47 may similarly be implemented using hardware, firmware, and/or components which execute software. These modules are defined moreso by their functions as set out below rather than a particular internal structure. The present disclosure would enable a skilled person to implement these modules in any of various ways to perform their respective functions.

The Ethernet interface 48 and the inter-apparatus interface 49, like the optical interface 42, include components such as physical ports or connectors and possibly other components which support communications over respective links. In the case of the Ethernet interface 48, these components may include at least an Ethernet port and a MAC device. The structure of the inter-apparatus interface 49 may be dependent upon the type of connection(s) and/or protocol(s) over which information is to be exchanged between installations of apparatus in a redundant pair. In one embodiment, the inter-apparatus interface 49 is another Ethernet interface.

In operation, the optical interface 42 enables communications via a SONET/SDH connection, and the Ethernet interface 48 represents an example of an interface that enables reception of communication traffic that includes content for transmission from the apparatus 40 via the SONET/SDH connection. The content for transmission on the SONET/SDH connection might be voice information in TDMoE frames, for example. It should be appreciated that such content need not necessarily include the entirety of received traffic. The content to be transmitted from the apparatus 40 through the optical interface 42 might include only certain parts or fields in received traffic, such as only part of a received Ethernet frame.

The inter-apparatus interface 49 enables communications between the apparatus 40 and a further or second apparatus which, with the apparatus 40, forms a redundant pair. For full redundancy, the second apparatus has the same structure as the example apparatus 40, and the first apparatus and the second apparatus of a redundant pair communicate through their respective inter-apparatus interfaces 49. The optical interface 42 of the second apparatus enables communications via a second SONET/SDH connection and the Ethernet interface 48 of the second apparatus represents an example of an interface that enables reception of communication traffic that includes content for transmission from the second apparatus via the second SONET/SDH connection. Thus, each apparatus of a redundant pair handles incoming communication traffic for transmission on its respective SONET/SDH connection.

An apparatus in a redundant pair performs slightly different operations in the In-Service state and the Standby state, since those states impact the interface at which content for transmission via its SONET/SDH connection would be received. During normal operation, only one apparatus in a redundant pair is in each operating state at any time.

When the example apparatus 40 is in the In-Service state, the bridging module 46 receives, through the Ethernet interface 48, communication traffic that includes content for transmission from the apparatus via the SONET/SDH connection supported by the optical interface 42. The content is provided to the optical interface 42 by the bridging module 46, through the traffic processor 44 in the example shown, for transmission via the SONET/SDH connection. The bridging module 46 also transmits the content to the second apparatus through the inter-apparatus interface 49 for transmission via the second SONET/SDH connection.

In this scenario, the second apparatus is in the Standby state. At the second apparatus, the bridging module 46 receives, through the inter-apparatus interface 49, content for transmission from the second apparatus via the SONET/SDH connection supported by its optical interface 42, and provides that content to the optical interface for transmission via the second SONET/SDH connection.

It should be noted that the same apparatus can operate in either of the In-Service and Standby states. Therefore, the bridging module 46 of the example apparatus 40 might pass content that is received through the Ethernet interface 48 to both the optical interface 42 and the inter-apparatus interface 49, which would be the case when the apparatus is in the In-Service state. In the Standby state, an apparatus 40 would not receive live communication traffic through its Ethernet interface 48, since such traffic is sent to only the In-Service apparatus of a redundant pair. Thus, in the Standby state, an apparatus 40 would receive content for transmission on its SONET/SDH connection through its inter-apparatus interface 49, and pass that content to the optical interface 42.

A bridging module 46 in an apparatus thus transmits received content to a further apparatus in a redundant pair unless the content was received from that further apparatus.

In one embodiment, the Ethernet interface 48 enables reception of Ethernet traffic destined for a first Ethernet MAC address, and the Ethernet interface of the second apparatus in the redundant pair enables reception of Ethernet traffic destined for a second Ethernet MAC address that is different from the first Ethernet MAC address. However, only one apparatus of the pair actually receives Ethernet traffic, such as TDMoE traffic in one embodiment, from an Ethernet network at any time. If the example apparatus 40 were implemented at each head network element 14, 16 (FIG. 1), for example, the leaf network elements 18, 20 might have the MAC addresses of both of the head network elements, but send traffic through the Ethernet network 17 to only one of the head network elements. The different MAC addresses provide redundancy protection for communications in the Ethernet network 17, but only one of those addresses is used by the leaf network elements 18, 20 at a time in order to avoid duplicating Ethernet traffic.

Referring again to FIG. 2, any of several mechanisms could potentially be used by the bridging module 46 to bridge received content to a second apparatus of a redundant pair. For example, Ethernet frames received through the Ethernet interface 48 could be duplicated by the bridging module 46 and sent in their entirety to the traffic processor 44 and to the inter-apparatus interface 49 for transfer to the redundant apparatus. Another option would be to extract the content that is to be sent on the SONET/SDH connections of the apparatus and the redundant apparatus and forward that content to the local traffic processor 44 and to the redundant apparatus through the inter-apparatus interface 49.

The traffic processor 44 receives from the bridging module 46 the content for transmission from the apparatus 40 via the SONET/SDH connection supported by the optical interface 42. The content may be in the form of the traffic originally received, illustratively Ethernet frames, or in a modified form. A SONET/SDH payload including the content is synthesized by the traffic processor 44, which also transmits the SONET/SDH payload via the SONET/SDH connection that is supported by the optical interface 42. The form of the content may vary between the communication traffic in which it was originally received and the SONET/SDH payload synthesized by the traffic processor 44. In one embodiment, content is mapped between the TDM payload of TDMoE frames and the SONET/SDH payload through jitter buffers. Various implementations of such mapping may be used to synthesize the same SONET/SDH payload at the traffic processors 44 of each apparatus in a redundant pair.

The preceding description relates primarily to communication traffic that includes content to be transmitted on SONET/SDH connections. Embodiments of the present invention may also be implemented in conjunction with bidirectional communications. In this case, the apparatus 40 may receive communication traffic through the optical interface 42 and transfer at least some content of that traffic to the Ethernet interface 48 for transmission in Ethernet traffic. In the example network 10 (FIG. 1), traffic received by the head network elements 14, 16 over redundant SONET/SDH connections on the optical links 22, 24 might include content that is to be forwarded on to the leaf network elements 18, 20.

In one implementation, the traffic processor 44 controls the flow of content received from the optical interface 42 to the Ethernet interface 48. In order to avoid duplicating Ethernet traffic in the direction from the head network elements 14, 16 to the leaf network elements 18, 20 (FIG. 1), for instance, only the In-Service head network element 14 might be allowed to pass content from the optical interface 42 to the Ethernet interface 48. The Standby head network element 16 in this case does not pass content from the optical interface 42 to the Ethernet interface 48. In this example, the traffic processor 44 passes or blocks content on the basis of operating state, although this function could potentially be provided by the bridging module, 46 or another component in other embodiments.

Since an apparatus 40 operates differently depending on its current operating state in a redundant pair, the state module 47 is provided in some embodiments to determine whether the apparatus is in the In-Service operating state or the Standby operating state in the redundant pair. The determined state could be reported to the bridging module 46 and/or possibly other components, which then perform any state-dependent operations accordingly. The bridging module 46, for example, might provide received content for transmission through the optical interface 42 and possibly the inter-apparatus interface 49 depending on whether the apparatus 40 is in the In-Service or Standby state. This function could instead be controlled on the basis of the interface through which content is received, as described above. Behaviour of the traffic processor 44, at least in its handling of content received on a SONET/SDH connection, may similarly change between different operating states. An indication of current operating state could therefore also or instead be provided to the traffic processor 44 by the state module 47.

Operating state indications could potentially be distributed to components of the apparatus 40 in any of various ways. For instance, a state indication might be provided to each component that performs state-dependent operations each time a change in state is detected by the state module 47. An indication of current operating state could instead be stored in a memory (not shown) by the state module 47 for subsequent access by other components as those components are preparing to perform state-dependent operations. The state module 47 may also or instead support a query/response mechanism, whereby an indication of current state is provided to another component in response to a received query message. Embodiments of the invention are in no way limited to these or any other particular mechanisms for advising other components of the current operating state of the apparatus 40.

A determination of the current operating state of an apparatus 40 may be made, for example, on the basis of communication traffic that is received through the Ethernet interface 48. If communication traffic that includes content for transmission via the SONET/SDH connection through the optical interface 42 is received through the Ethernet interface 48, then the apparatus 40 is in the In-Service state, since communication traffic is sent only to one apparatus in a redundant pair.

The state determination could also or instead be made on the basis of whether the content for transmission via the SONET/SDH connection is received through the Ethernet interface 48 or through the inter-apparatus interface 49. In the In-Service state, content would be received through the Ethernet interface 48 in Ethernet traffic, whereas in the Standby state content would be received from the second apparatus through the inter-apparatus interface 49.

Another possible option for determining the current operating state of an apparatus 40 might be a state indication received from the redundant apparatus through the inter-apparatus interface 49. The inter-apparatus interface 49 could potentially be used to transfer other information than content that is to be transmitted via SONET/SDH connections. State indications that provide indications of a current operating state of each apparatus in the redundancy pair could be exchanged through the respective inter-apparatus interfaces 49. Since only one apparatus in a redundant pair should be in each state at any time, a state indication from the redundant apparatus would advise an apparatus of the current state of its redundant apparatus. The apparatus that receives a state indication should be in the opposite operating state from its redundant "mate" apparatus.

Two-way state determination by each apparatus in a redundant pair could be supported where the state module 47 in each apparatus sends a state indication to the other apparatus. Such an indication could use a single bit if only two states are to be detected. In embodiments in which other states are possible, during startup or initialization for instance, additional bits could be used. Other forms of state information are also possible.

Current operating states could also be signalled to optical equipment at the far end of SONET/SDH connections, to coordinate the control of operating states between optical equipment and Ethernet equipment, for example. The state module 47 might provide state indications to the optical interface 42 and/or to the traffic processor 44 for this purpose. The head network elements 14, 16 in FIG. 1, for instance, provide redundancy protection for optical communications on the links 22, 24, and accordingly an APS operation affecting the head network elements might be initiated due to an optical side fault or condition. Therefore, some form of coordination of operating state control might also be provided in some embodiments. Examples of such coordination mechanisms are disclosed in the co-pending application referenced above.

Figure 3:
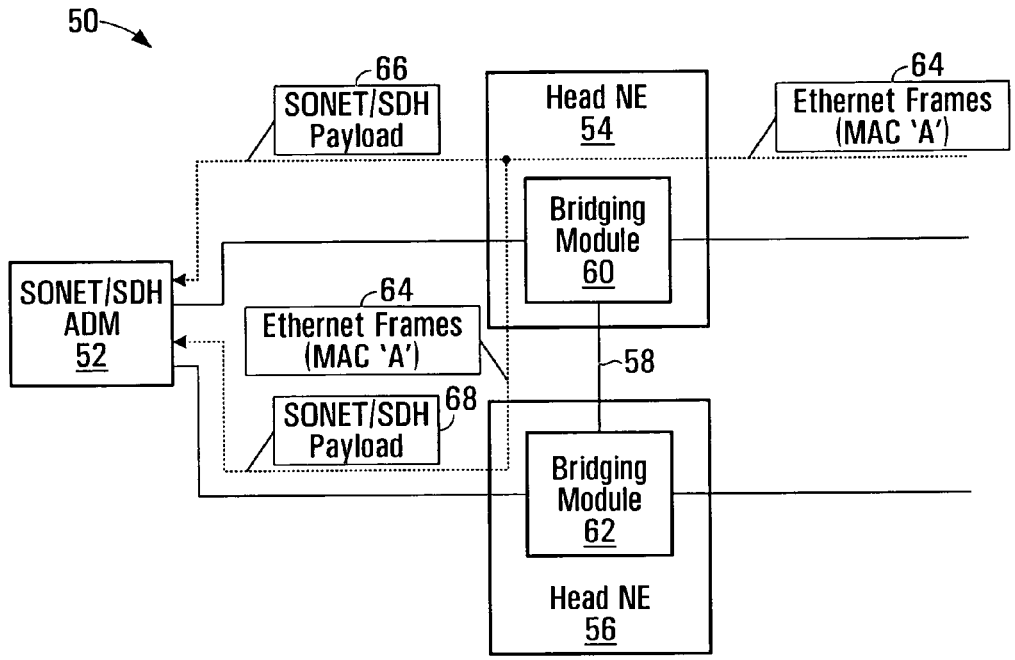
FIGS. 3 and 4 are block diagrams illustrating a bridging function.
Figure 4:
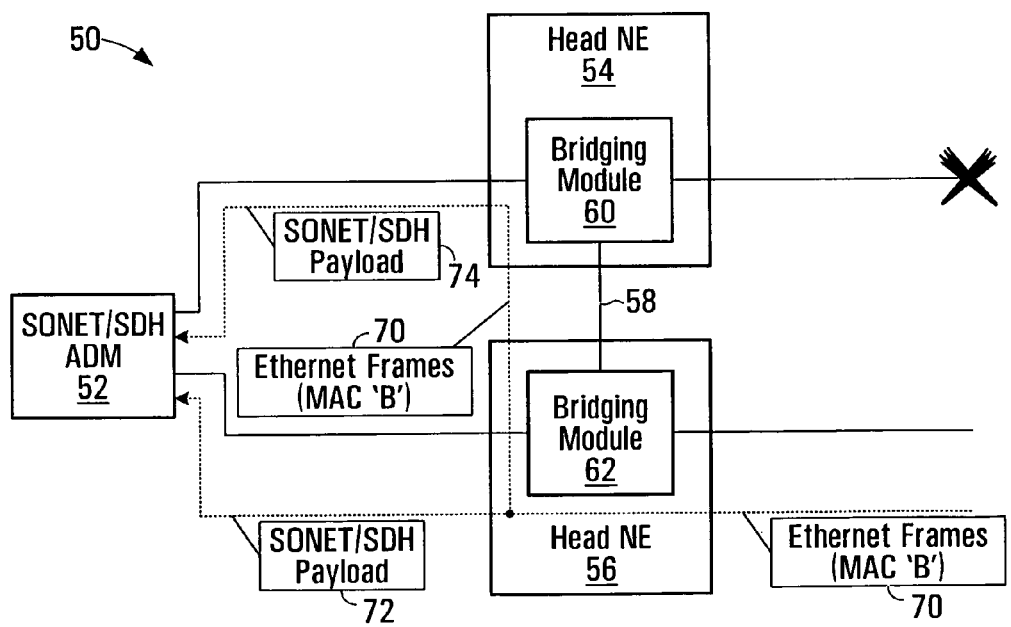

FIGS. 3 and 4 are block diagrams illustrating a bridging function. The example system 50 which is shown in FIGS. 3 and 4 is similar to the network side of FIG. 1, and includes a SONET/SDH ADM 52 and two head network elements 54, 56 which are operatively coupled together at 58. Although the head network elements 54, 56 may include other components, only their bridging modules 60, 62 have been explicitly shown in order to avoid overly complicating the drawing. The head network elements 54, 56 have respective MAC addresses 'A' and 'B'.

In FIG. 3, the head network element 54 is in the In-Service state and the head network element 56 is in the Standby state. Ethernet frames 64, illustratively TDMoE traffic, destined for MAC 'A' are received by the In-Service head network element 54 and also sent to the Standby head network element 56 by the bridging module 60. Although the Standby head network element 56 has a different MAC address 'B', in accordance with an embodiment of the invention the bridging module 62 accepts two MAC addresses, including MAC 'A' and MAC 'B'.

The bridging modules 60, 62, as well as the traffic processors (not shown) of the head network elements 54, 56, may accept both MAC addresses. In a modern Ethernet network containing switches or routers, traffic destined for MAC 'A' is sent only to the head network element 54. Similarly, traffic for MAC 'B' would be routed only to the head network element 56. This is the expected and desired behaviour of an Ethernet network, as it uses bandwidth efficiently by routing traffic only where necessary. In one embodiment, neither the Ethernet interface 48 (FIG. 2) nor the inter-apparatus interface 49 of a head network element filters traffic based on MAC address, and this function is instead handled by the bridging module 46 (60, 62 in FIG. 3) and the traffic processor 44.

SONET/SDH payloads 66, 68 are synthesized at each head network element 54, 56 for transmission via redundant SONET/SDH connections. The SONET/SDH payloads 66, 68 are identical, thereby providing the payload mirroring required for 1+1 APS between the SONET/SDH ADM 52 and the head network elements 54, 56. APS functions between the SONET/SDH ADM 52 and the head network elements 54, 56 are thereby unaffected by the fact that Ethernet is used instead of the usual T1 connections. The head network elements 54, 56 handle all interworking between SONET/SDH and Ethernet, which allows APS for the optical links to operate normally. No changes at the optical side of the head end network elements 54, 56 are necessary.

The synthesis of identical SONET/SDH payloads 66, 68 based on the same Ethernet frames is represented in FIG. 3 by the dashed lines. It should be noted that while the SONET/SDH payloads 66, 68 are identical, SONET/SDH frames transmitted by the head network elements 54, 56 need not be entirely identical. Such frames include other information than payloads, and that other information may be different for the head network elements 54, 56.

Like the bridging module 62 of the Standby head network element 56, the bridging module 60 of the In-Service head network element 54 also accepts two MAC addresses, including its own MAC 'A' and MAC 'B' of the Standby head network element. In the case of an APS switch-over event at the Ethernet side, such as loss of TDMoE traffic to the head network element 54 as shown in FIG. 4, the head network element 56 begins to receive Ethernet frames 70 and enters the In-Service state. Received Ethernet frames 70 that are destined for MAC 'B' are bridged from the new In-Service head network element 56 to head network element 54, which is now in the Standby state. SONET/SDH payload mirroring is maintained, and identical SONET/SDH payloads are synthesized for transmission to the SONET/SDH ADM 52 as shown at 72, 74.

It can be seen perhaps most clearly from FIGS. 3 and 4 that an embodiment of the invention provides a system including a first apparatus and a second apparatus, such as the head network elements 54, 56, that form a redundant pair. The first apparatus is operatively coupled to a first SONET/SDH connection and handles communication traffic that includes content for transmission from the first apparatus via the first SONET/SDH connection, and the second apparatus is operatively coupled to the first apparatus and to a second SONET/SDH connection and handles communication traffic that includes content for transmission from the second apparatus via the second SONET/SDH connection. Each apparatus also includes a bridging module.

The bridging module of the first apparatus transmits content on the first SONET/SDH connection. As described in detail above, content may be received by a bridging module from an Ethernet network or from the second apparatus in a redundant pair in one embodiment. If the content was not received from the second apparatus, the bridging module further transmits the content to the second apparatus for transmission on the second SONET/SDH connection. The bridging module of the second apparatus similarly transmits content on the second SONET/SDH connection and, if the content was not received from the first apparatus, transmits the content to the first apparatus for transmission on the first SONET/SDH connection.

Figure 5:
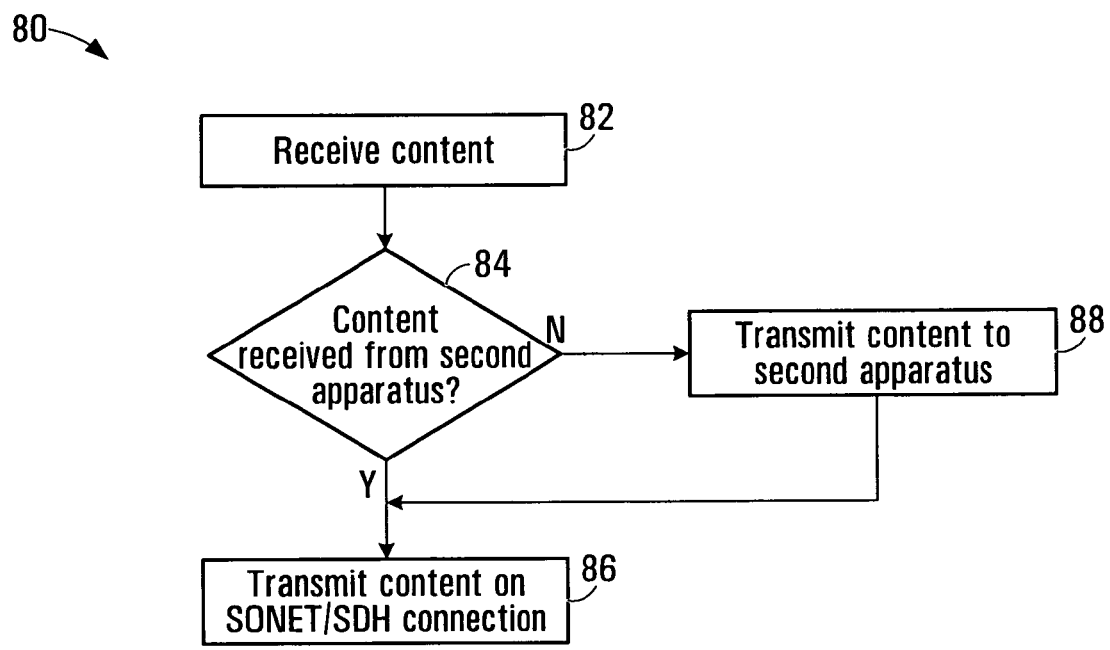
FIG. 5 is a flow diagram illustrating an example method.

Embodiments of the invention have been described above primarily in the context of apparatus and systems. Aspects of the invention may also be embodied, for example, in method form. FIG. 5 is a flow diagram illustrating an example method.

The example method 80 involves receiving content at 82. The content is received at a first apparatus that handles communication traffic including content for transmission via a first SONET/SDH connection. The first apparatus and a second apparatus that handles communication traffic comprising content for transmission via a second SONET/SDH connection form a redundant pair. If it is determined at 84 that the content was not received from the second apparatus, then the content is not only transmitted via the first SONET/SDH connection at 86, but is further transmitted to the second apparatus at 88 for transmission via the second SONET/SDH connection. If the content was received from the second apparatus, the content is transmitted via the first SONET/SDH connection at 86.

FIG. 5 represents an illustrative example of a method according to one embodiment. Various ways of performing the operations shown in FIG. 5, and examples of additional operations that may be performed, will be apparent from the description and drawings relating to apparatus and system implementations, for example. Operations may also or instead be performed in a different order than shown. The transmission of received content on a SONET/SDH connection and to the other apparatus in a redundant pair need not be in any particular order, although in embodiments where transmission of the same payloads on the first and second SONET/SDH connections should be synchronized, content could be transmitted to the second apparatus at 88 before it is transmitted on the first SONET/SDH connection at 86. Further variations may be or become apparent to those skilled in the art.

Bridging as disclosed herein provides a mechanism other than traditional electrical bridging to present mirrored SONET/SDH signals to subtending equipment. Embodiments may also minimize Ethernet traffic, since remote leaf network elements need not send duplicate TDMoE traffic to both In-Service and Standby head network elements.

Thus, bridging as proposed herein is not just traditional SONET/SDH GR-253 electrical port bridging and mirroring. Embodiments may provide bridging at the Ethernet MAC layer, allowing for SONET/SDH payload and port mirroring.

What has been described is merely illustrative of the application of principles of embodiments of the invention. Other arrangements and methods can be implemented by those skilled in the art without departing from the scope of the present invention.

For example, the division of functions shown in FIG. 2 is illustrative of an embodiment of the invention. Further, fewer, or different elements may be used to implement the techniques disclosed herein. Bridging and SONET/SDH payload synthesis could potentially be performed by a single physical component, for instance, such that a bridging module synthesizes a SONET/SDH payload that includes content for transmission via a SONET/SDH connection, and provides the SONET/SDH payload to an optical interface.

In addition, although described primarily in the context of methods and systems, other implementations of the invention are also contemplated, as executable instructions stored on a computer-readable medium, for example.

We claim:

1. An apparatus comprising:
an optical interface that enables communications via a Synchronous Optical NETwork (SONET)/Synchronous Digital Hierarchy (SDH) connection;
a traffic interface that enables reception of communication traffic comprising content for transmission from the apparatus via the SONET/SDH connection;
a bridging module operatively coupled to the optical interface and to the traffic interface, and
an inter-apparatus interface, operatively coupled to the bridging module, that enables communications between the apparatus and a redundant apparatus, the redundant apparatus comprising an optical interface that enables communications via a redundant SONET/SDH connection, a traffic interface that enables reception of communication traffic comprising content for transmission from the redundant apparatus via the redundant SONET/SDH connection, and a bridging module operatively coupled to the optical interface and to the traffic interface of the redundant apparatus, the apparatus and the redundant apparatus forming a redundancy protection pair;
the bridging module of the apparatus providing content, that is for transmission from the apparatus via the SONET/SDH connection and is received through the traffic interface of the apparatus, to the optical interface of the apparatus for transmission via the SONET/SDH connection, transmitting the content to the bridging module of the redundant apparatus through the inter-apparatus interface for transmission via the redundant SONET/SDH connection,
and providing content, that is for transmission from the redundant apparatus via the redundant SONET/SDH connection and is received from the bridging module of the redundant apparatus through the inter-apparatus interface, to the optical interface of the apparatus for transmission via the SONET/SDH connection.

2. The apparatus of claim 1, wherein the traffic interface of the apparatus comprises an Ethernet interface that enables reception of Ethernet traffic destined for a first Ethernet Media Access Control (MAC) address, and wherein the traffic interface of the redundant apparatus comprises an Ethernet interface that enables reception of Ethernet traffic destined for a second Ethernet MAC address different from the first Ethernet MAC address.

3. The apparatus of claim 2, wherein the Ethernet traffic destined for the first Ethernet MAC address comprises Ethernet frames, and wherein the bridging module of the apparatus transmits content to the bridging module of the redundant apparatus through the inter-apparatus interface as Ethernet frames.

4. The apparatus of claim 1, further comprising:
a traffic processor, operatively coupled to the bridging module of the apparatus and to the optical interface of the apparatus, that receives content from the bridging module of the apparatus, synthesizes a SONET/SDH payload comprising the content, and transmits the SONET/SDH payload via the SONET/SDH connection.

5. The apparatus of claim 4, wherein the traffic interface of the apparatus comprises an Ethernet interface that enables reception of Ethernet traffic comprising Ethernet frames, wherein the bridging module of the apparatus provides content to the traffic processor as Ethernet frames, and wherein the traffic processor synthesizes the SONET/SDH payload from the Ethernet frames.

6. The apparatus of claim 1, wherein the bridging module of the apparatus synthesizes a SONET/SDH payload comprising received content, and provides the SONET/SDH payload to the optical interface of the apparatus.

7. The apparatus of claim 1, further comprising:
a state module that determines whether the apparatus is in a first operating state or a second operating state in the redundancy protection pair.

8. The apparatus of claim 7, wherein the state module determines whether the apparatus is in the first operating state or the second operating state on the basis of whether the content for transmission via the SONET/SDH connection is received through the traffic interface of the apparatus or the content for transmission from the redundant apparatus via the redundant SONET/SDH connection is received from the bridging module of the redundant apparatus through the inter-apparatus interface.

9. The apparatus of claim 7, wherein the state module further transmits a state indication to the redundant apparatus through the inter-apparatus interface, the state indication providing an indication of the determined operating state of the apparatus.

10. A method comprising:
receiving, at an apparatus that handles communication traffic comprising content for transmission via a Synchronous Optical NETwork (SONET)/Synchronous Digital Hierarchy (SDH) connection, content for transmission from the apparatus via the SONET/SDH connection, the apparatus forming a redundancy protection pair with a redundant apparatus that handles communication traffic comprising content for transmission via a redundant SONET/SDH connection, the apparatus comprising: a traffic interface that enables reception of communication traffic comprising content for transmission via the SONET/SDH connection, an optical interface that enables communications via the SONET/SDH connection, a bridging module operatively coupled to the optical interface and to the traffic interface, and an inter-apparatus interface operatively coupled to the bridging module that enables communications between the apparatus and the redundant apparatus, the redundant apparatus comprising: an optical interface that enables communications via a redundant SONET/SDH connection, a traffic interface that enables reception of communication traffic comprising content for transmission from the redundant apparatus via the redundant SONET/SDH connection, and a bridging module operatively coupled to the optical interface and to the traffic interface of the redundant apparatus;
determining whether the received content was received through the traffic interface of the apparatus or from the bridging module of the redundant apparatus through the inter-apparatus interface;
transmitting the received content via the SONET/SDH connection; and
further transmitting the received content from the bridging module of the apparatus to the bridging module of the redundant apparatus through the inter-apparatus interface for transmission via the redundant SONET/SDH connection, on determining that the received content was received through the traffic interface of the apparatus.

11. The method of claim 10, wherein the apparatus handles Ethernet traffic destined for a first Ethernet Media Access Control (MAC) address, and wherein the redundant apparatus handles Ethernet traffic destined for a second Ethernet MAC address different from the first Ethernet MAC address.

12. The method of claim 11, wherein the Ethernet traffic destined for the first Ethernet MAC address comprises Ethernet frames, and wherein further transmitting the received content to the redundant apparatus comprises transmitting the received content as Ethernet frames.

13. The method of claim 10, further comprising:
synthesizing a SONET/SDH payload comprising the received content,
wherein transmitting the received content via the SONET/SDH connection comprises transmitting the SONET/SDH payload.

14. The method of claim 13, wherein the communication traffic comprises Ethernet frames, and wherein synthesizing comprises synthesizing the SONET/SDH payload from the Ethernet frames.

15. The method of claim 10, further comprising:
determining whether the apparatus is in a first operating state or a second operating state in the redundancy protection pair on the basis of whether the received content was received at the apparatus from the bridging module of the redundant apparatus through the inter-apparatus interface.

16. A non-transitory computer-readable medium encoded with computer executable instructions which when executed cause a computer to perform the method of claim 10.

17. A system comprising:
an apparatus, operatively coupled to a Synchronous Optical NETwork (SONET)/Synchronous Digital Hierarchy (SDH) connection, for handling communication traffic comprising content for transmission from the apparatus via the SONET/SDH connection; and
a redundant apparatus, operatively coupled to the apparatus and to a redundant SONET/SDH connection, for handling communication traffic comprising content for transmission from the redundant apparatus via the redundant SONET/SDH connection, the apparatus and the redundant apparatus forming a redundancy protection pair;
each of the apparatus and the redundant apparatus comprising a bridging module implemented using hardware,
the bridging module of the apparatus transmitting content on the SONET/SDH connection and, where the content was not received from the redundant apparatus, further transmitting the content to the bridging module of the redundant apparatus for transmission on the redundant SONET/SDH connection,
the bridging module of the redundant apparatus transmitting content on the redundant SONET/SDH connection and, where the content was not received from the apparatus, further transmitting the content to the bridging module of the apparatus for transmission on the SONET/SDH connection.

18. The system of claim 17, wherein the apparatus handles Ethernet traffic comprising Ethernet frames that contain content for transmission via the SONET/SDH connection, wherein the redundant apparatus handles Ethernet traffic comprising Ethernet frames that contain content for transmission via the redundant SONET/SDH connection, and wherein the bridging module of each apparatus further transmits the content to the bridging module of the other apparatus in Ethernet frames.

19. The system of claim 18, wherein the apparatus handles Ethernet traffic destined for a first Ethernet Media Access Control (MAC) address, and wherein the redundant apparatus handles Ethernet traffic destined for a second Ethernet MAC address different from the first Ethernet MAC address.

20. A system comprising:
an apparatus, operatively coupled to a Synchronous Optical NETwork (SONET)/Synchronous Digital Hierarchy (SDH) connection, for handling communication traffic comprising content for transmission from the apparatus via the SONET/SDH connection; and
a redundant apparatus, operatively coupled to the apparatus and to a redundant SONET/SDH connection, for handling communication traffic comprising content for transmission from the redundant apparatus via the redundant SONET/SDH connection, the apparatus and the redundant apparatus forming a redundancy protection pair;
each of the apparatus and the redundant apparatus comprising a bridging module implemented using hardware, the bridging module of the apparatus transmitting content on the SONET/SDH connection and, where the content was not received from the redundant apparatus, further transmitting the content to the redundant apparatus for transmission on the redundant SONET/SDH connection, the bridging module of the redundant apparatus transmitting content on the redundant SONET/SDH connection and, where the content was not received from the apparatus, further transmitting the content to the apparatus for transmission on the SONET/SDH connection, the apparatus further comprising a traffic processor operatively coupled to the bridging module of the apparatus, the traffic processor receiving, from the bridging module of the apparatus, the content for transmission from the apparatus via the SONET/SDH connection, synthesizing a SONET/SDH payload comprising the content, and transmitting the SONET/SDH payload via the SONET/SDH connection, the redundant apparatus further comprising and wherein the redundant apparatus a traffic processor operatively coupled to the bridging module of the redundant apparatus, the traffic processor receiving, from the bridging module of the apparatus, the content for transmission from the apparatus via the redundant SONET/SDH connection, synthesizing a SONET/SDH payload comprising the content, and transmitting the SONET/SDH payload via the redundant SONET/SDH connection.

* * * * *